Oct. 12, 1965  V. E. MATULAITIS  3,211,374
RAPID HEATING ENGINE COOLING SYSTEM
Filed July 9, 1963
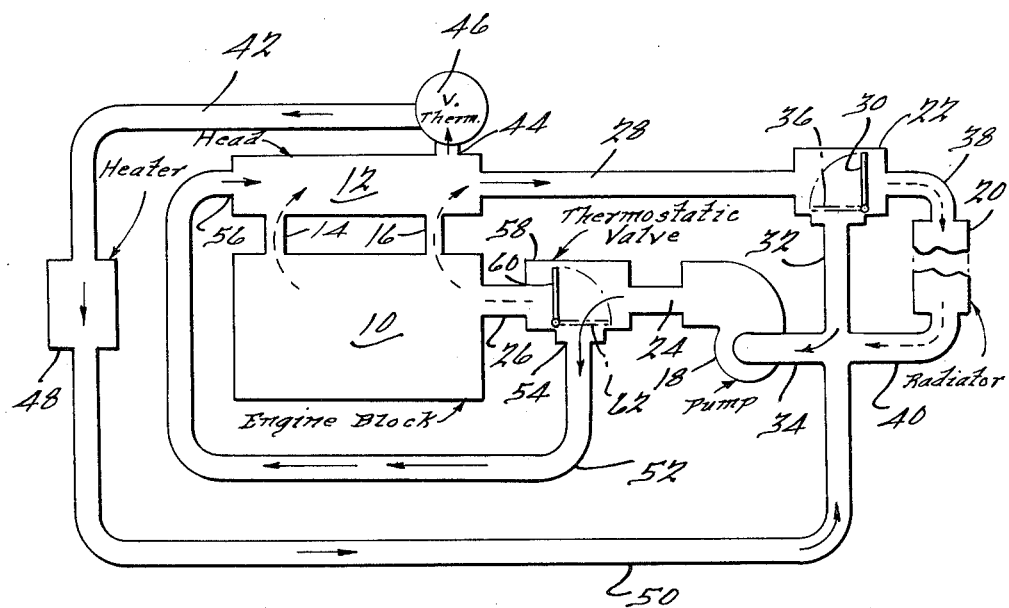
INVENTOR.
Victor E. Matulaitis.
BY
Harness, Dickey & Pierce
ATTORNEYS.

United States Patent Office 3,211,374
Patented Oct. 12, 1965

3,211,374
RAPID HEATING ENGINE COOLING SYSTEM
Victor E. Matulaitis, 26250 Evelyn, Franklin, Mich.
Filed July 9, 1963, Ser. No. 293,811
9 Claims. (Cl. 237—8)

This invention relates to internal combustion engine cooling systems, and more particularly to a vehicular engine cooling system including a hot water vehicle passenger compartment heating device and having means to decrease the time required to heat the passenger compartment during engine warm up.

Hot water heating systems are widely used in automobile applications because of exceptional comfort and performance characteristics. The hot water systems are associated with and, of course, depend on heat in the engine cooling system for operation. The comfort and heating characteristics of automobile hot water heater systems depend upon the attainment of high temperature level and steady-state engine operating conditions. When the engine is cold, the hot water heater cannot begin to function efficiently until the engine has been sufficiently warmed up to provide hot water.

It is, therefore, a principal object of my invention to provide means for increasing the rate of heat exchange between the coolant of an engine cooling system and the engine. A specific object is to substantially reduce the length of time required to obtain hot water for an automobile hot water heater when the engine is cold such as at the beginning of engine operation in cold climates.

Another object of the invention is to provide a hot water heater system for an automobile wherein the flow of coolant in the engine cooling system is controlled in a manner achieving more rapid heating of the coolant than with previous systems. To this end it is proposed to substantially divert the flow of coolant of the engine cooling system from a normal path through the cylinder block and head portions of the engine to a quick heat path through only the cylinder head portion of the engine during those times when the engine is cold such as during engine warm up.

A further object of the invention is to provide a hot water heater system having a separate fast heat flow passage means for selectively reducing the volume of coolant flow through the cylinder block relative to the volume of coolant flow through the cylinder head, and, for the maximum rate of initial heating, confining the flow of coolant within the engine to a path including only the head portion of the engine. In addition, an object is to integrate fast heat means in an engine cooling system in a manner requiring minimal changes in existing systems and being operable in association with a single coolant system circulating pump.

Still another object of the present invention is to provide a fast heat coolant system for increasing the rate of heating of an engine coolant during engine warm up by the provision of thermostatic valve means to divert, in whole or in part, a flow from a normal path through the engine block to a fast heat path through the engine head without flow through the engine block. To this end the thermostatic valve means is adapted to open the fast heat path and restrict or close the normal coolant path when the engine coolant is below a predetermined temperature level and to close the fast heat path and open the normal coolant path when the temperature level of the coolant is above the predetermined temperature level whereat sufficient heat is available to provide adequate heating through the automobile hot water heating system.

The principles of the present invention are hereinafter described in detail by reference to an illustrative schematic representation of a preferred embodiment of the invention shown on the accompanying drawing. It will be understood that the drawing is purely schematic and is not intended to be a representation of relative proportions, sizes, dimensions, or component construction; but instead, is intended to show functional operation only to facilitate ease of description and understanding.

Analysis of heat transfer characteristics of typical conventional internal combustion engines have shown that approximately 40 to 50% of the total heat transfer from the combustion gases to the engine occurs in the internal cylinder head area even though the internal cylinder head area comprises only 25 to 35% of the cylinder block area which contacts the gases. Consequently, the part of an internal combustion engine having the greatest heat transfer capability is that portion of the system immediately surrounding and beyond the combustion chambers, in the head area. It is now proposed to provide an internal combustion engine hot water system which effectively utilizes the heat transfer characteristics of an internal combustion engine to substantially decrease the time required to raise the temperature level to obtain the heat of the engine coolant for a hot water heater system.

Referring now to the drawing, an engine block 10 and the head portion 12 are schematically illustrated as separate units connected by suitable passage means 14, 16. It is to be understood that the head and engine block are actually directly secured together in a conventional manner and that the passages 14 and 16 are provided by mating or matching ports in abutting surfaces of the block and head.

The engine cooling system is of the continuous flow type and comprises pump means 18, radiator means 20, suitable passage means establishing a flow path from the pump means through the block and the head to the radiator and back to the pump means, and a radiator bypass passage means and associated thermostatic temperature controlled valve means 22. The valve 22 may be of any conventional design such as the common poppet-type thermostatic temperature controlled valve. Coolant is normally circulated in the system by the pump through a path comprising passage 24 from the pump, a passage 26 to the engine block 10, the passages 14, 16 to the head 12, and a passage 28 to the conventional thermostatic control valve 22. When the engine is cold and the coolant is below a predetermined temperature, the valve 22 is in the position indicated at 30 and flow of coolant is directed into a passage 32 for return to the pump through a passage 34. When the engine coolant reaches the predetermined temperature level, the control valve 22 is actuated to the position shown in phantom at 36 and the coolant is thereafter directed from the passage 28 to a passage 38 through the radiator 20 and returned to the pump through a passage 40.

The hot water heater system of the vehicle normally comprises a passage 42 which is connected at one end 44 to the coolant system in/or adjacent the head 12. A conventional thermostatic temperature controlled valve 46 may also be provided, if desired, to control the flow of coolant into the passage 42 and close the passage 42 until a predetermined temperature level is attained in the engine coolant system. When the valve 46 opens, a portion of the system coolant flows through the passage 42 to the heater 48 and is returned to the pump through a passage 50.

In order to provide means for rapid heating of the engine coolant, a bypass passage 52 is connected to the cooling system at one end 54 upstream of the engine block 10 and is connected at the other end 56 to/or adjacent the head 12 downstream of the engine block in a manner enabling coolant to flow through the head to the passage 28. A thermostatic temperature controlled valve 58 which may be of conventional design is provided to control flow of the coolant between cooling system passage 26 and rapid heating passage 52. When the temperature of the coolant is below a predetermined minimum value, the thermostatic valve 58 is in the position shown at 60 and directs the coolant from the passage 24 into the passage 52 to completely bypass the engine block 10. When the temperature level of the coolant reaches the predetermined value, the valve is actuated to the position shown at 62 and the coolant is thereafter directed from the passage 24 into the passage 26 in the usual manner.

Engine cooling systems are normally designed so as to provide an adequate volume of liquid coolant at an adequate rate of flow to prevent engine overheating when the engine is fully warmed. In conventional cooling systems, the rate of coolant flow through the engine block during the initial period of operation of an initially cool engine is substantially greater than necessary to prevent overheating of the engine. The rate of coolant flow through the block during initial phases of engine warm-up may be very substantially reduced without danger of deleterious overheating of the block. In the present arrangement, the rate of coolant flow through the block is, during the initial heating of the engine, reduced either to a very low value or zero. As a result, the rate of heat transfer to the coolant in the block is greatly reduced and the rate of temperature increase of the block is substantially increased relative to a conventional arrangement. This not only increases the rapidity of the heating of the coolant circulating in the head to improve the operation of the heater in the passenger compartment, but also reduces the warm-up time of the engine with an attendant improvement in the performance and life of the engine.

Further, in the disclosed system, by majority or entirely eliminating the coolant chambers in the block from the coolant-flow path during the initial heating phases, the rate of heating of the flowing coolant is increased due to the fact that the volume of coolant which is flowing in a path including the head is smaller than the total volume of coolant not only by the amount of coolant that is in the radiator and heater lines (as in the conventional arrangements) but also by the amount of coolant which is in the block. Additionally, to the extent that the rate of heating of the block is sufficiently lower than the rate of heating of the head, during the initial operation of any given engine, so that the coolant passing through and heated in the head is actually at a higher temperature than the walls of the coolant chamber in the block, then the disclosed arrangement further achieves increased rapidity of coolant heating as a result of the elimination or reduction of the transfer of heat from the heated coolant to the cooler block during the initial heating of the engine.

The operation of the system will be apparent to those skilled in the art to which the invention relates. However, it should be noted that the thermostatic valve 58, although identical in behavior to the thermostatic valves 22 and 46, is set to operate at temperatures less than the operative temperatures to which the other valves are responsive. Consequently, when the engine is cold during initial warm up or the like, substantially all of the coolant discharged from the pump 18 flows through the branch passage 52 into the head 12 and directly back to the pump through the passages 28, 32, 34. Circulation of coolant in the cylinder block is restricted since the valve is in position 60 and effectively seals the passage 26 from the passage 24. The thermostatic valve 46 will remain closed to prevent flow into the passage 42 until a predetermined temperature level sufficient for satisfactory operation of the hot water heater means is attained. When the coolant becomes sufficiently warm, the thermostatic valve 46 opens and the heated coolant flows through the heater 48 to provide heat for the interior of the car in a time interval far less than with conventional equipment. In fact, it is possible to reduce the time required for satisfactory operation of the heater 48 by less than half the time previously required. As the temperature level of the engine and the coolant increases further, the thermostatic valve 22 opens the radiator passage 38 and closes bypass passage 32.

It will be apparent that thermostatic valve 58 may be selected to act in a modulating manner if desired, over a selected range of temperatures, and that, if desired for any given engine, provision may be made to insure a certain minimum flow of coolant through the block under all conditions either by providing for incomplete closing of the valve 58 in position 60 or by providing a small bypass line around valve 58. Similarly, if in the designing of a system embodying the principles of the present invention, it is desired to provide a continuing greater rate of coolant flow through the head than through the block, thermostatic valve 58 may be arranged to incompletely close off path 52 when that valve is in position 62 or the valve may be designed so that such complete closure of bypass valve 52 does not occur unless the coolant temperature has increased to an abnormally high value.

Modification of the disclosed arrangements will be apparent to those skilled in the art. The illustrated arrangement has the merit that it may be incorporated as an element of the engine cooling system with but minor modifications of the existing cooling system. Among the possible modifications, it will be perceived that if in the manufacture of new engines passageways corresponding to those denoted 14 and 16 are eliminated, reduced or blocked, then individually controlled parallel coolant flow paths may be established through the engine block and through the head to achieve the benefits of the present invention.

Since the principles of the present invention are capable of being utilized in various others manners in association with an internal combustion engine, it is intended that the scope of the invention, as defined by the appended claims, be construed to include alternative constructions and uses of the invention except insofar as limited by the prior art.

The invention claimed is:

1. In an engine cooling system, pump means for circulating coolant through said system, said system comprising passage means connecting said pump means to the engine block, passage means connecting the engine block to the engine head, return passage means connecting the engine head to said pump means, separate passage means connecting said pump means directly to said head means and bypassing said engine block, a heater system having passage means connected to said cooling system to obtain flow of coolant therethrough, and means to establish a flow of coolant in said heater system directly from the engine head through said separate passage means connecting the pump means to the engine head and bypassing the engine block.

2. A vehicle heating system comprising an engine block, an engine head, a cooling system for said engine block and said engine head comprising pump means, radiator means, passage means providing a flow path in said cooling system from said pump means to said engine block to said engine head to said radiator means and back to said pump means, bypass passage means bypassing said radiator means and connecting said head means directly to said pump means, a first thermostatic valve means mounted in said bypass passage means to control flow through said radiator, said heater system comprising heater means and passage means connecting said heater means to said cooling system upstream of said pump means and downstream of said engine block and said engine head, thermostatic valve means controlling flow through said passage means of said heater system from the downstream connection to the upstream connection, separate passage means connecting said pump means to said engine head and bypassing said engine block, and a thermostatic valve means to control flow through said separate passage means and direct flow therethrough bypassing said engine block until said cooling system reaches a predetermined temperature level and thereafter directing flow to said engine block from said pump means, said thermostatic valve means controlling flow to said radiator means being responsive to a temperature level higher than said predetermined temperature level to confine flow in said cooling system to a path bypassing said radiator means until said separate passage means is closed, said thermostatic valve means associated with said heater system being responsive to a temperature level higher than said predetermined temperature level and less than said temperature level to which said thermostatic valve means controlling flow to said radiator means is responsive to open said heater system passage means to flow from said engine head at a temperature level intermediate the other temperature levels.

3. In a vehicular heating system having heater means associated with a cooling system of an internal combustion engine having a head portion and a block portion and a radiator, said cooling system having a pump for circulating a coolant through the engine, first coolant passage means connecting said heater means and said pump through only said head portion, second coolant passage means connecting said heater means and said pump through said head portion and said block portion, and thermostatic valve means operable to confine flow of coolant to said heater means through said first coolant passage means at the start of engine operation and during engine warm-up until the coolant reaches a predetermined high temperature at which time said valve means being effective to thereafter permit flow of coolant to said heater means through said second passage means.

4. In a vehicular heating system having heater means associated with a cooling system of an internal combustion engine having a head portion and a block portion, said cooling system having a radiator and a pump for circulating coolant through the engine and the radiator, first coolant passage means connecting said heater means and said pump through only said head portion, second coolant passage means connecting said heater means and said pump through said head portion and said block portion, third coolant passage means connecting said engine and said pump through said radiator, fourth coolant passage means connecting said engine directly to said pump and bypassing said radiator, and thermostatic valve means operable to confine flow of coolant in said engine only to said first and fourth coolant passage means at the start of engine operation and during engine warm-up until the coolant reaches a predetermined high temperature, said valve means being effective thereafter to permit flow of coolant through said second and third coolant passage means.

5. In a heater system associated with a cooling system of an internal combustion engine having a plurality of coolant passage means therein and a radiator, at least one of said coolant passage means extending through parts of the engine operable at higher temperatures than other parts of the engine through which the other coolant passage means extend, heater means connected to said coolant passage means, pump means to circulate coolant through said coolant passage means and said heater means, and thermostatic valve means operable to confine flow of coolant to said heater means through only said one of said coolant passage means at the start of engine operation and during engine warm-up until the coolant reaches a predetermined high temperature.

6. In a heater system associated with a cooling system of an internal combustion engine having a plurality of coolant passage means therein and a radiator, at least one of said coolant passage means extending through parts of the engine operable at higher temperatures than other parts of the engine through which the other coolant passage means extend, said one of said coolant passage means having a smaller coolant capacity than the other of said coolant passage means, heater means connected to said coolant passage means, pump means to circulate coolant through said coolant passage means and said heater means, and thermostatic valve means operable to confine flow of coolant to said heater means through only said one of said coolant passage means at the start of engine operation and during engine warm-up until the coolant reaches a predetermined high temperature, said valve means also being operable to confine flow of coolant to said heater means at the start of engine operation and during engine warm-up to only that portion of coolant in the cooling system in the one of said coolant passage means until a predetermined high temperature condition is attained.

7. In a heating system having heater means associated with an internal combustion engine cooling system including a radiator, said cooling system comprising a radiator and pump means for circulating coolant through the cooling system, separate passage means connected to said pump means and said heater means and extending through separate portions of the engine with one such portion of the engine tending to operate at a higher temperature than the other portions of the engine, said passage means extending through the other portions of the engine having a larger coolant capacity than the passage means extending through the one such portion and a majoral part of the coolant in said cooling system being contained in the passage means extending through the other portions of the engine, and thermostatic valve means operable at the start of engine operation and during engine warm-up until a predetermined temperature condition is attained to confine flow of coolant to only the passage means extending through the one portion of the engine and to confine the amount of coolant flowing to only a minoral part of the coolant in said cooling system.

8. In a vehicular heating system having heater means associated with a cooling system of an internal combustion engine having a head portion and a block portion, said cooling system having a radiator and a pump for circulating coolant through the engine and the radiator, first coolant passage means connecting said heater means and said pump through only said head portion, second coolant passage means connecting said heater means and said pump through said head portion and said block portion, a first thermostatic valve means operable to confine flow of coolant to said heater means through said first coolant passage means at the start of engine operation and during engine warm-up until the coolant reaches a predetermined high temperature condition at which time said first valve means being effective to permit flow of coolant to said heater means through said second passage means, third coolant passage means connecting said engine and said pump through said radiator, fourth coolant passage means connecting said engine directly to said pump and bypassing said radiator, and second thermostatic valve means operable to confine flow of coolant in said engine only to said fourth coolant passage means at the start of engine operation and during engine warm-up until the coolant reaches a predetermined high temperature at which time said second valve means being effective to permit flow of coolant to said radiator through said third coolant passage means.

9. In a vehicular heating system having heater means associated with a cooling system of an internal combustion engine having a head and a block, said cooling system having a radiator and a pump for circulating coolant through the engine and the radiator, passage means connecting said pump and said heater means through said head, passage means connecting said pump and said head directly, passage means connecting said pump and said radiator through said head and said block, thermostatic valve means to selectively close the passage means connecting said pump and said heater means through said block to confine flow to said heater means from the engine to a path extending only through said head, thermostatic valve means to close the passage means connecting said radiator and said pump through said head and said block, thermostatic valve means to open the passage means connecting said heater means and said pump through said head, and said valve means being operable during the start of engine operation and engine warm-up when the coolant attains predetermined high temperature conditions.

References Cited by the Examiner

UNITED STATES PATENTS

| 2,445,684 | 7/48 | Mallory | 123—41.08 |
| 2,468,735 | 5/49 | Brubaker | 123—41.08 |
| 2,706,085 | 4/55 | Nallinger | 237—8 |
| 2,749,049 | 6/56 | Smith | 237—8 |

EDWARD J. MICHAEL, *Primary Examiner.*